United States Patent [19]

Mead

[11] Patent Number: 5,278,653
[45] Date of Patent: Jan. 11, 1994

[54] METHODS AND APPARATUS FOR DIGITAL CORRECTION OF AFTERGLOW IN FLYING SPOT SCANNERS

[75] Inventor: Terrence W. Mead, Hertford, United Kingdom

[73] Assignee: Rank Cintel Limited, England

[21] Appl. No.: 730,840

[22] PCT Filed: Nov. 14, 1990

[86] PCT No.: PCT/GB90/01756
§ 371 Date: Jul. 15, 1991
§ 102(e) Date: Jul. 15, 1991

[87] PCT Pub. No.: WO91/07844
PCT Pub. Date: May 30, 1991

[30] Foreign Application Priority Data

Nov. 15, 1989 [GB] United Kingdom ............... 8925775
May 3, 1990 [GB] United Kingdom ............... 9009992

[51] Int. Cl.$^5$ ................................................ H04N 5/253
[52] U.S. Cl. ................................. 358/160; 358/167; 358/172; 358/214
[58] Field of Search ............... 358/160, 139, 172, 163, 358/33, 242, 214, 166, 167, 37, 54; H04N 5/263, 5/267

[56] References Cited

U.S. PATENT DOCUMENTS

| | | | |
|---|---|---|---|
| 3,621,132 | 11/1971 | Page | 358/160 |
| 4,001,502 | 1/1977 | van Rossel | 358/165 |
| 4,032,777 | 11/1981 | Kemner et al. | 358/160 |
| 4,454,541 | 6/1984 | Duschl | 358/139 |
| 4,602,291 | 7/1986 | Temes | 358/213.19 |
| 4,667,237 | 5/1987 | Yokomizo | 358/160 |
| 4,675,735 | 6/1987 | Wilkinson et al. | 358/160 |
| 4,698,685 | 10/1987 | Beaverson | 358/163 |
| 4,962,419 | 10/1990 | Hibbard et al. | 358/37 |
| 4,974,810 | 12/1990 | Fiske | 358/160 |
| 5,014,133 | 5/1991 | Mumford | 358/214 |
| 5,047,861 | 9/1991 | Houchin et al. | 358/166 |
| 5,049,984 | 9/1991 | Moore, Jr. et al. | 358/54 |
| 5,111,311 | 5/1992 | Yamamoto | 358/163 |

FOREIGN PATENT DOCUMENTS

| | | |
|---|---|---|
| 0074683 | 9/1982 | European Pat. Off. . |
| 0396746 | 11/1988 | European Pat. Off. . |
| 0357084 | 9/1989 | European Pat. Off. . |
| 3629009 | 3/1988 | Fed. Rep. of Germany . |
| 59-8360 | 1/1984 | Japan . |
| 60-111349 | 5/1985 | Japan . |
| 61-208960 | 9/1986 | Japan . |
| 62-186671 | 8/1987 | Japan . |
| 1198620 | 7/1970 | United Kingdom . |
| 2149261 | 6/1985 | United Kingdom . |
| 8805243 | 7/1988 | World Int. Prop. O. . |

*Primary Examiner*—Mark R. Powell
*Assistant Examiner*—Jeffrey S. Murrell
*Attorney, Agent, or Firm*—Ostrolenk, Faber, Gerb & Soffen

[57] ABSTRACT

In order to correct for the afterglow or flare in a flying spot telecine, an afterglow or flare correction circuit comprises a series of stages each of which calculate the proportion of the video signal at any one scan location (e.g. pixel) which is attributable to afterglow or flare from successive previously scanned locations or adjacent locations respectively. Each processing circuit comprises a delay, a multiplier for multiplying the delayed signal by a scaling factor dependent on the amount of decay of the delayed signal or the flare at that location and a substractor for subtracting the output of the multiplier from the measured video signal. The output of the corrector subtracts a portion of the output from the previous scan locations in accordance with the stored scaling factor for that location. The scaling factor is derived over a number of video frames. Each measurement is held in an accumulator and averaged to counter noise errors. Flare correction may either be performed on a single horizontal scanning line or on a block of pixels on adjacent lines surrounding the pixel.

38 Claims, 7 Drawing Sheets

METHODS AND APPARATUS FOR DIGITAL CORRECTION OF AFTERGLOW IN FLYING SPOT SCANNERS

FIELD OF THE INVENTION

This invention relates to flying spot scanners, and in particular to methods of and apparatus for compensating for deviations from an ideal output signal caused by inherent properties of the flying spot scanner such as afterglow and/or flare.

BACKGROUND OF THE INVENTION

The invention is particularly applicable to telecine. In essence, flying spot telecine operates by imaging a cathode ray tube raster onto a film, collecting the light passing through the film and converting the collected light into a television signal representative of the images on the film. One problem with such telecines is afterglow, which is the persistence of light from the cathode ray tube phosphor after the spot has moved. When the film changes from clear to dense, the video output should immediately change to a minimum. However, afterglow effects cause a decay from peak to minimum signals. This decay shows itself as a decaying white streak to the right of any white information on a black picture. In existing machines, the afterglow characteristic of the phosphor used decays to 10% in about 150 nanoseconds but continues to emit smaller proportions of light which remain significant for about 50 microseconds.

For a infinitely small clear spot on an otherwise dark film, picture streaking will follow the phosphor decay curve. However, if a larger spot of clear film is considered the streaking will correspond to the integral of the phosphor decay curves over the exposed scan time. To overcome this unwanted streaking it has been common practice to correct for afterglow using a series of individually adjustable differentiating circuits in an analogue corrector circuit.

Previously, the afterglow correcting circuitry has been the only remaining analogue component of a telecine machine. It would be desirable to provide a digital afterglow corrector that was compatible with the remainder of the telecine. However, although the existing analogue correctors could be simulated using equivalent digital circuits, these would be very complex with little direct benefit.

Flare is a phenomenon which is present in all flying spot scanners. Flare may be divided into three broad categories; high frequency flare, low frequency flare and flare ringing at intermediate frequencies. Flare rings are known to be caused by changes of refractive index at the glass/air interface at the face plate. This causes light to be reflected back to the phosphor screen at different positions producing a ring around the spot. Although it is not possible to say exactly what causes high and low frequency flare it is clear that both types are produced from a number of different sources which interact with one another, for example general background light and local scattering at the glass-to-air interface. This latter type varies with the image position and is much greater at the edge of an image and tends to smear the image. Multiple reflections tend to produce higher frequency flare.

Although flare can be reduced to an extent by using high quality faceplates and by increasing the thickness of the faceplate as described, for example, in our European patent application EP-A-0266154, flare remains a problem.

SUMMARY OF THE INVENTION

The invention aims to provide a circuit which can correct a digital video signal for afterglow and/or flare, which is relatively simple, and which is automatic. In its broadest form, the invention provides a corrector circuit which determines the contribution to the video signal at any given location made by afterglow or flare from adjacent scanning locations and which subtracts this contribution from the video signal. More specifically, the invention provides a method of correcting a digital signal produced by a flying spot scanner to condensate for deviations from an ideal output signal caused by inherent properties of the flying spot scanner, comprising the steps of determining for the signal corresponding to a given location of the flying spot, the contribution to the signal from each of a plurality of adjacent scanning locations or groups of locations, and subtracting each of the determined contributions from the video signal to provide a corrected signal.

In one embodiment, the signal is a video signal and is subjected to a series of delays each equal in length to the time taken for the soot to scan one location or group of locations, and the signal after each of the delays is scaled according to the aggregate length of delay, each of the scaled delayed signals being subtracted from the video signal corresponding to the said given spot location.

Preferably, the scaling of the delayed signals is achieved by applying scaling factors to the signals, which factors are derived by blanking the cathode ray tube at all locations except one and measuring the value of the video signal from that location after each of the series of delays.

In one embodiment, the method corrects afterglow of the phosphor on the CRT face, in which case contributions are determined for scanning locations already visited by the flying spot. In another embodiment the method corrects for flare and the contributions are determined for locations substantially symmetrically arranged about the given location.

In one embodiment, each delay is equal in length to the time taken for the spot to scan one pixel of the cathode ray tube (C.R.T) scanning map. Although accurate, this embodiment would require in the order of 500 stages to compensate for an afterglow which persisted for 30 microseconds. In order to reduce the cost with only a slight loss in accuracy, a further preferred embodiment of the invention increases the length of each delay to twice that of the previous delay. Thus, the length of each delay is equal to $(2^n - 1)$ times the time taken to scan one location, where n is the position in the series of the delay relative to the given location (i.e. symmetrically disposed about the central point for flare correction). A compromise between the two may be chosen in which the length of each successive delay increases as the aggregate delay increases.

Tn one embodiment, flare from adjacent pixels on the same horizontal scanning line only is corrected for. In a modification correction is two-dimensional and is extended to, for example, a 7×7 block of pixels including the test pixel.

The invention also provides apparatus for correcting a digital signal produced by a flying spot scanner to compensate for deviations from an ideal output signal caused by inherent properties of the flying spot scanner, comprising means for determining for the signal corresponding to a given flying spot location, for contribution to that signal from each of a plurality of adjacent scanning locations or groups of locations, and means for subtracting each of the determined contributions from the video signal to provide a corrected signal.

The apparatus may comprise means for subjecting the video signal to a series of delays each equal in length to the time taken for the spot to scan one location or group of locations, and means for scaling the signal after each of the delays according to the aggregate length of delay, the subtracting means comprising means for subtracting each of the scaled delayed signals from the video signal corresponding to the said given soot location.

Similarly to the method of the invention, the apparatus may be used either as a flare corrector or as an afterglow corrector.

The invention further provides apparatus for clamping the black level of an analogue video signal, comprising means for converting the analogue signal into a digital signal, means for correcting the digital signal to compensate for afterglow from a flying spot telecine, and means for determining the black level of the corrected signal, wherein a black level clamp correction signal is formed by black level measurement means and applied to the analogue video signal.

A further aspect of the invention is a method of clamping the black level of an analogue video signal, comprising converting the analogue signal into a digital signal, correcting the digital signal to comdensate for afterglow from a flying spot telecine, determining the black level of the corrected signal, deriving a black level clamp correction signal from the determined black level and applying the clamp correction signal to the analogue video signal.

The invention in its various embodiments is particularly suited for use with telecine machines. However, it is also applicable to television cameras and other apparatus using flying spot scanners.

BRIEF DESCRIPTION OF THE DRAWINGS

Embodiments of the invention will now be described by way of example and with reference to the accompanying drawings, in which:

FIG. 13 is a circuit diagram showing how two-dimensional flare can be corrected for.

DESCRIPTION OF PREFERRED EMBODIMENTS

Figure 1:
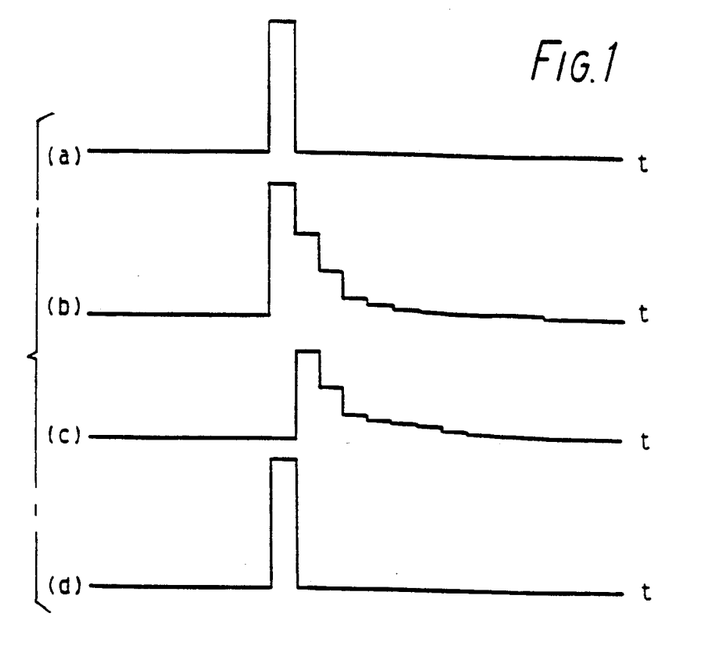
FIGS. 1a to 1d show respectively the ideal and actual composition of the video signal at any scanning location, the composition of the correcting signal, and the composition of the corrected signal.

Ideally, the video signal representing any one scanning location is formed solely from light attributable to the flying spot at that location. Such an ideal response is shown in FIG. 1a. However, in practice, the signal contains additional components from previously scanned locations due to afterglow. Thus, the actual video signal is made up of the component from that location, together with a series of additional components from previous scanned locations, the size of the previous components decreasing with increasing time since scanning. This actual composition is shown in FIG. 1b.

In order to compensate for these additional components, the afterglow correcting circuit to be described attempts to reproduce the additional afterglow components (FIG. 1(c)) and to subtract these reproduced components from the actual measured video signal. Thus, the corrected signal shown in FIG. 1(d) should be equal to the ideal signal of FIG. 1(a).

Figure 2:
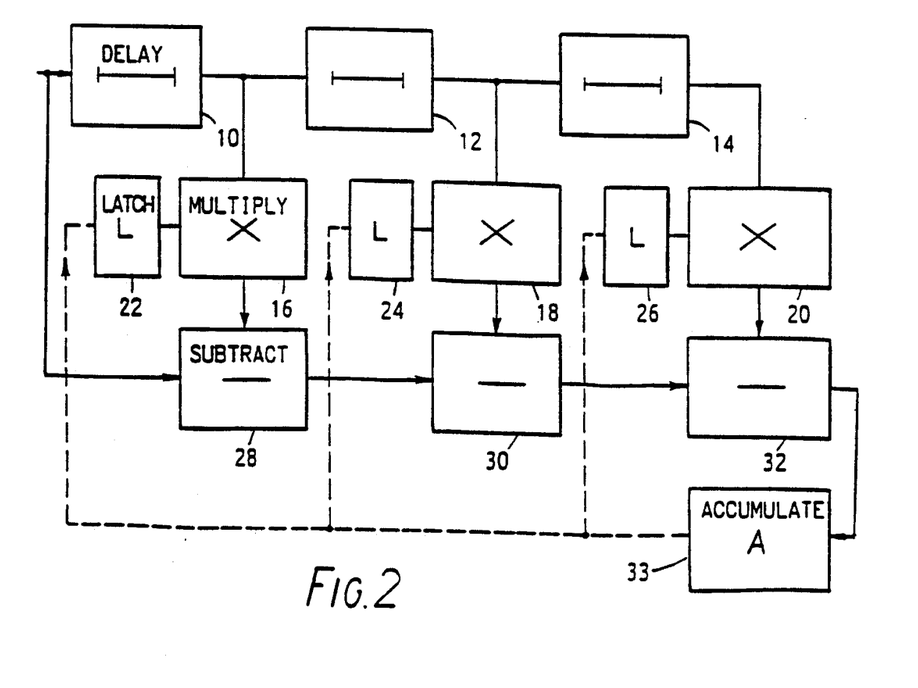
FIG. 2 is a block diagram of a first embodiment of the invention.

FIG. 2 shows a first embodiment of the automatic afterglow correcting circuit. The circuit employs a plurality of successive processing elements each incorporating a delay. Three such elements 10, 12, 14 are shown in FIG. 2. Each processing element represents one pixel of the scanning map and so each delay element 10, 12, 14 is equal to the length of time taken by the flying spot to traverse one scan location; for example 54 nanoseconds. In order to obtain good afterglow correction, a series of elements having a total of about 30 microseconds should desirably be provided although a total delay between 20 and 50 microseconds may be adequate.

In addition to the pixel delay, 10, 12, 14, each processing element comprises a signal multiplier 16, 18, 20 having one input supplied from the delay and the other input provided by a storage element 22, 24, 26, and a subtractor, 28, 30, 32 which subtracts the output of the multiplier from the input video signal Vin. The storage elements are conveniently latches L1 to L3.

Upon switching on or resetting the telecine machine, a set of co-efficients dependent on the response of the phosphor of each pixel of the scanning map is calculated in a process known as alignment. This process is described more fully in our co-pending application GB8913924.0. During the alignment process, the storage elements 22, 24 and 26 are loaded with appropriate co-efficients proportional to the level of decay of the phosphor after the aggregate delay at that stage. Thus, if there are n circuit elements and the elemental delay is assumed to be 54 nanoseconds, storage element 26 will be loaded with a co-efficient representing the decay after $n \times 54$ nanoseconds and storage element 24 will be loaded with a co-efficient representing the decay after $(n-1) \times 54$ nanoseconds etc.

Additional delays are added to the measured decay values to compensate for the pipeline delays of some components. To determine the decay values, the C.R.T. is blanked during the alignment operation at all locations but for one pixel. The value of the video output from that pixel occurring after each pixel delay is stored. To avoid the effects of random noise the alignment will perform many (for example 32) measurements of the decay values using the averages of these measurements as the stored co-efficient values.

Thus, at the end of each stage the product of the stored co-efficient representing the level of decay of light from previous scan locations and the video signal from that location is subtracted from the undelayed video signal. The output of each subtractor 28, 30, 32 is a signal from which has been removed afterglow from one further scan location. The cumulative effect of all the stages is to remove the effects of afterglow for substantially all of the decay period of the phosphor.

In FIG. 2 an accumulator 33 is included at the output of the final subtractor 32. The output of the accumulator 33 provides the input for the latch 22, 24, 26 of each stage. It is to be realised that the accumulator 33 is not essential.

Operation of the embodiment of FIG. 2 will now be described with reference to FIGS. 5 and 6 which show, respectively, waveform diagrams for a single pixel width pulse such as is used during alignment and a wider pulse; in this example three pixels wide.

The ideal signal is shown for each pulse and it is desired that the corrected output should correspond as closely as possible to the ideal signal.

Figures 5, 6:
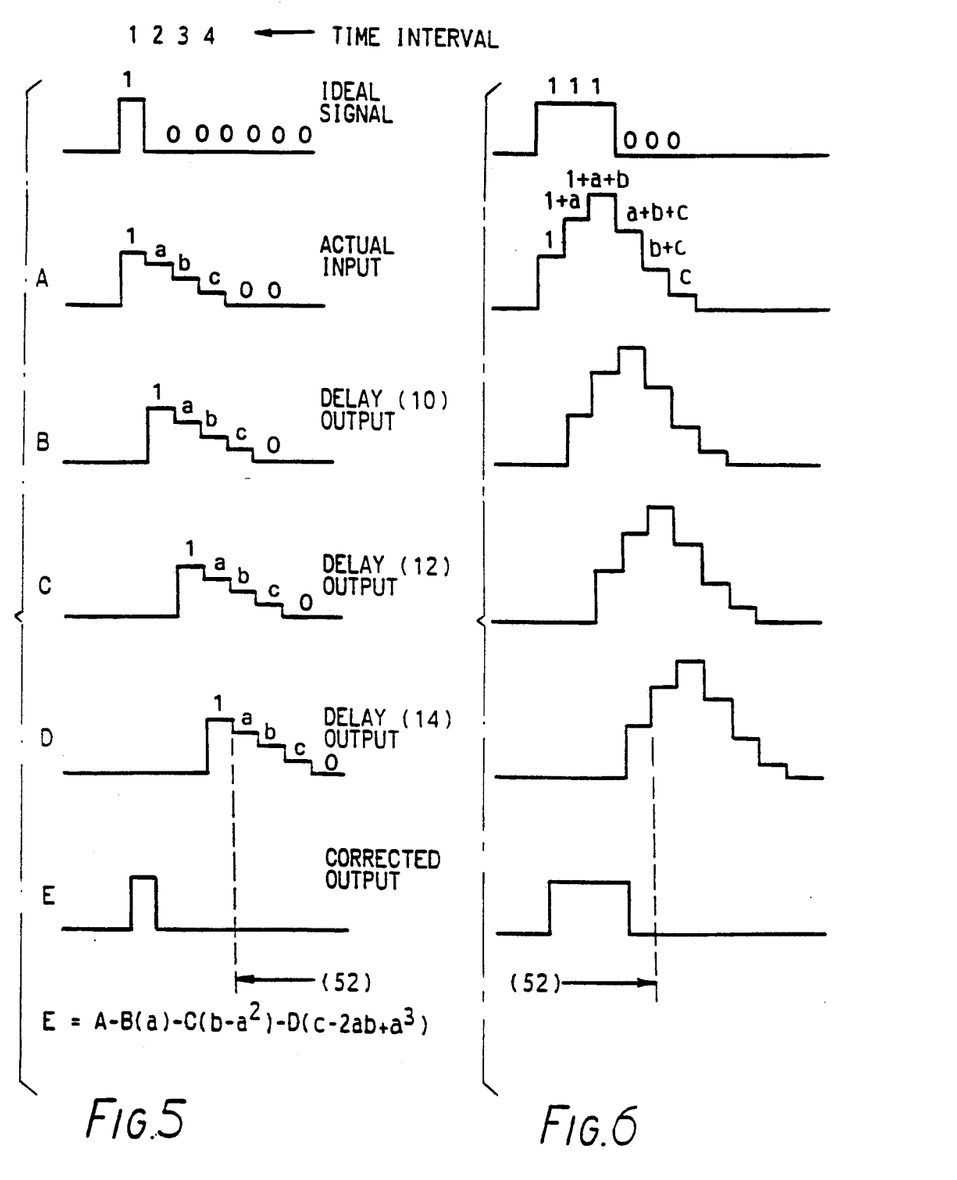
FIG. 5 is a waveform diagram for a single pixel showing corrections made to correct afterglow using the circuit of FIG. 2.
FIG. 6 is a waveform diagram similar to FIG. 5 for a three pixel wide pulse.

The description is given, for simplicity, for the three stage example and, in this case, the corrected output will not be ideal and the corrected waveforms will not conform to those shown in FIGS. 5 and 6E to the right of dotted line 52. The residual errors that are present are corrected by using further stages as mentioned previously.

Alignment is described with reference to FIGS. 2 and 5, and is commenced by setting up scan blanking such that a single pixel only is illuminated. This pixel should be near the picture centre. Latches 22, 24 and 26 are set to zero and the accumulator is cleared.

Figure 7:
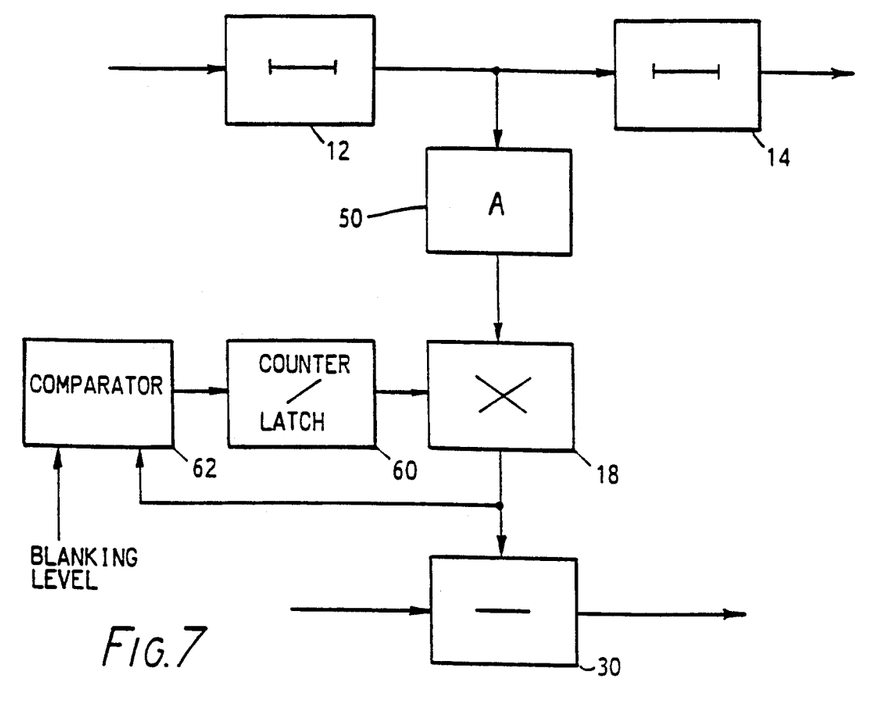
FIG. 7 is a circuit segment of a fourth embodiment of the invention.

When time interval 2 is at the output, input value a) (FIG. 7A) is stored in the accumulator 33. This is repeated for a further 31 frames and the accumulator sum is divided by 32. This value is loaded into latch 22. The output is now corrected by latch 22.

Thus the output of the corrector is as follows:

| Time interval | Output |
|---|---|
| 1 | 1 |
| 2 | $a - (1 \times a) = 0$ |
| 3 | $b - (a \times a) = b - a^2$ |

The accumulator is then cleared and, when time interval 3 is at the output, the process described above is repeated and the value $(b - a^2)$ is loaded into latch 24 (the second stage latch). Thus the corrector output is now:

| Time Interval | Output |
|---|---|
| 1 | 1 |
| 2 | $a - (1 \times a) = 0$ |
| 3 | $b - (a \times a) - 1(b - a^2) = 0$ |
| 4 | $C - (b \times a) - a(b - a^2) = c - 2ab + a^3$ |

This output has been corrected by latches 22 and 24.

The accumulator is then cleared again and when time interval 4 is at the output the averaged value $c - 2ab + a^3$ is loaded into the third stage latch 26. Thus the output now becomes:

| Time Interval | Output |
|---|---|
| 1 | 1 |
| 2 | $a - (1 \times a) = 0$ |
| 3 | $b - (a \times a) - 1(b - a^2) = 0$ |
| 4 | $c - (b \times a) - a(b - a^2) - 1(c - 2ab + a^3) = 0$ |

Thus the output is corrected by the three latches 22, 24 and 26 and the output E in FIGS. 5 and 6 is $A - B(a) - C(b - a^2) - D(c - 2ab + a^3)$.

The alignment blanking is then switched off and the machine returned to normal operation in which the outputs are automatically corrected. Of course, in practice there would be very many more stages in the correction process.

The addition of the accumulator averaging over 32 samples has the advantage of preventing errors caused by noise. Any number of samples may be taken and 32 is only given as an example.

Figure 3:
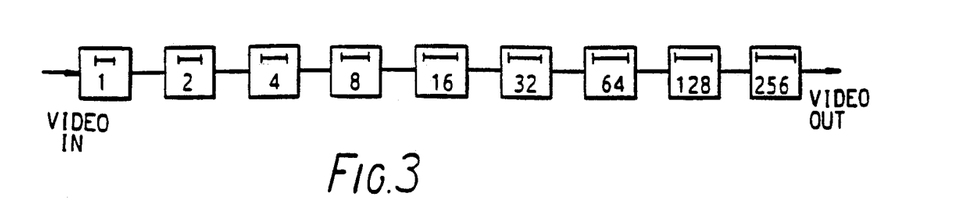
FIG. 3 is a schematic representation of a second embodiment of the invention.

Although the circuits described are accurate and provide improved performance, they require in the order of 500 processing elements in order to achieve a 30 microsecond compensation. Such a circuit may be uneconomical to produce. An alternative embodiment of FIG. 3 takes into account the fact that the contribution to the overall afterglow decreases with increasing delay. In FIG. 3, the signal delay is increased by a factor of 2 in each processing section. Thus, the first stage has a delay of one pixel, the second has a delay of two pixels, the third four pixels and so on. The delay at any stage is $2^{n-1}$ pixels where n is the number of the stage in the series.

The embodiment of FIG. 3 can achieve the required 500 pixel delay using only nine stages. These nine stages have a total of $2^9 - 1 = 511$ pixels which, at 54 nanoseconds per pixel represents a total delay of 27.6 microseconds. This embodiment reduces the complexity and cost of the circuit greatly whilst being accompanied by only a slight reduction in accuracy. A compromise between the circuits of FIGS. 2 and 3 may be chosen.

Where the stages of the corrector have different delay times; it is necessary to include an accumulator stage at the input of each multiplier. This modification is shown for a single stage in FIG. 4. An accumulator 50 is interposed between the delay stage and the multiplier. The accumulator 50 sums all the video samples during the preceding delay period. The total is then applied to the multiplier for correction by the contents of the latch and the accumulator is reset for the next delay period.

During the alignment sequence the latch is loaded with the average output value of the pixel occurring in the centre of that preceding delay period but otherwise using the alignment sequence previously described with reference to FIG. 2.

A further modification is illustrated in. FIG. 7. The latches of the previous embodiment are replaced by a combination counter/latch 60 which is connected to the output of a comparator 62. The inputs of the comparator are the output of the multiplier, for example multiplier 18, and the blanking level.

In this figure only a single circuit section is shown although a number of sections would be used as in the previous embodiment. The circuit is shown with an accumulator stage as it is a modification for the FIG. 4 circuit although this accumulator is not used during alignment and is essential.

The circuit operates in the following manner. The counter/latch is cleared to zero, and a test film fitted or alignment scan blanking activated. At the appropriately timed pixel the comparator 62 compares the output of multiplier 18 with its ideal value (blanking level), and increments or decrements the counter so as to improve the result. This process is repeated iteratively, but substantially simultaneously (in practice in quick sequence) for each circuit section. Where the counter 60 is a 16 bit counter, $2^{16}$ interations may be required to achieve the correct value with the addition of a further few for noise averaging. However, since the comparison is done on a proportional basis, the effects of lane to line shading are no longer important, therefore the iterations can be repeated at line rate.

A further problem which arises from the use of digital afterglow correction is that clamping of the signal black level cannot be done until after afterglow correction. However, black level clamping is required before A-to-D conversion of the input signal prior to correction.

Figure 8:
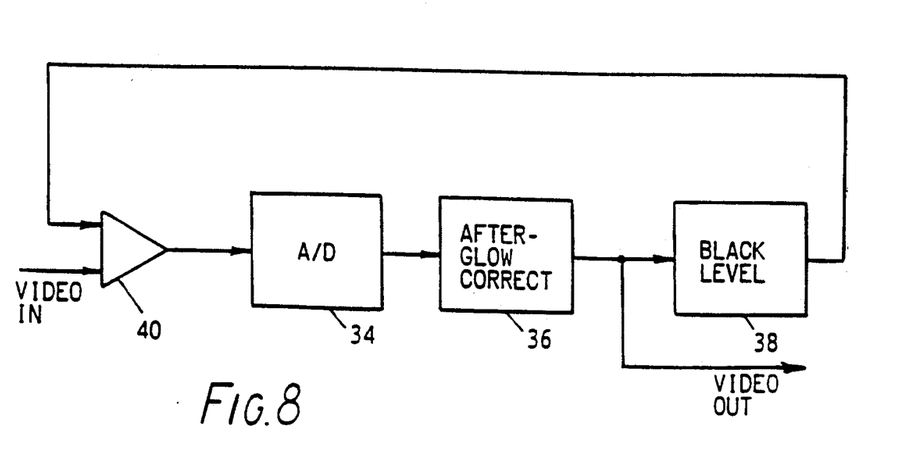
FIG. 8 is a block diagram of a black level clammimg circuit.
Figure 9:
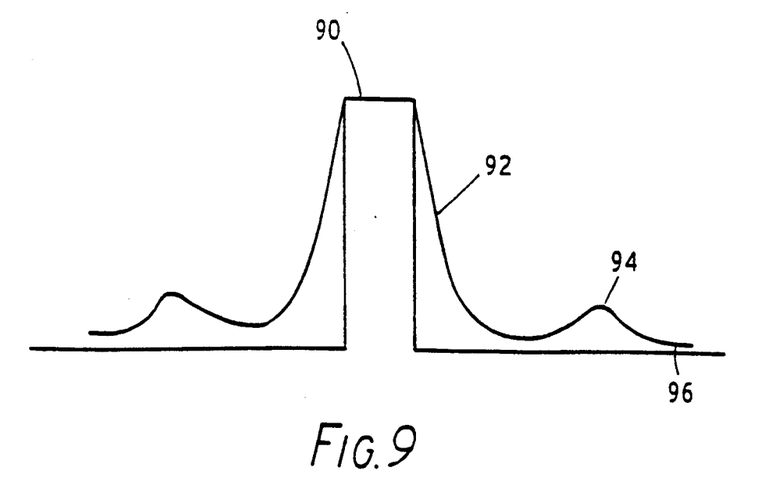
FIG. 9 is a schematic diagram illustrating the effects of flare on a pulse.

This problem may be overcome by the circuit of FIG. 8 in which the input analogue signal is converted to a digital signal by A-to-D converter 34. The digital signal is then corrected to remove afterglow by corrector 36 which may be of any of the types illustrated and the corrected signal taken as the output. The corrected signal also forms the input to a black level measurement device 38, the output of which is a clamp correction signal. This signal is fed back to the analogue circuits preceding the A-to-D converter 34. In FIG. 9 these circuits are represented by input amplifier 40.

The invention in its various embodiments has been described in relation to afterglow measurement and compensation. However, it is equally applicable to optical flare correction. The situations in which flare arises and the nature of flare has already been discussed. Briefly, as discussed above, flare results because of the interface between the glass of the face plate 95 of a CRT 96 (FIG. 14) and the ambient air. FIG. 9 shows how flare may affect a square pulse. The desired signal shape is referenced with the number 90. High frequency flare causes the transition from low to high to become less than instantaneous—illustrated at 92; flare ringing causes the characteristic peak 94 at a distance away from the pulse and low frequency flare 96 ensures that the pulse never reaches the low (black) level due to background light.

Figures 10, 11, 14:
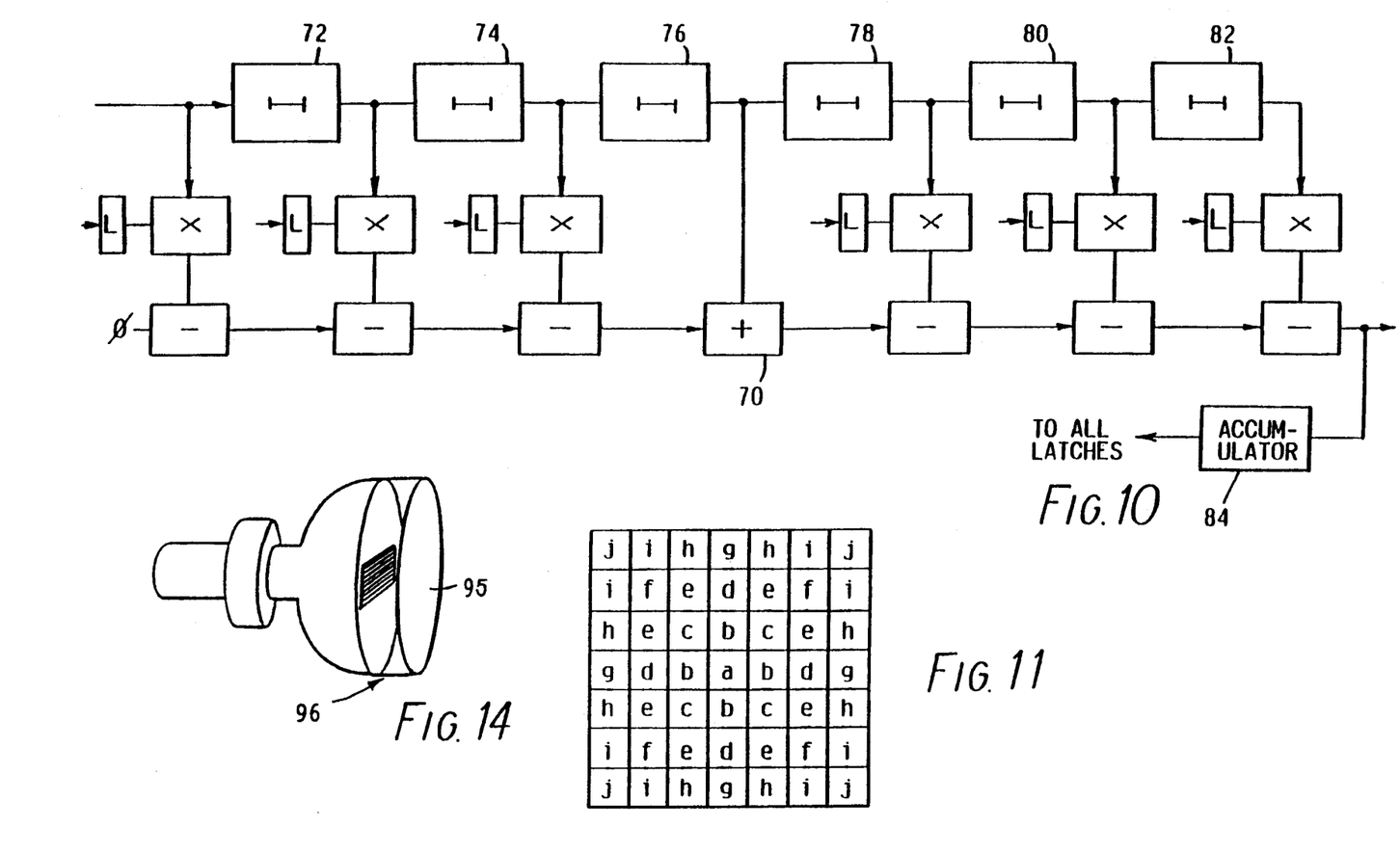
FIG. 10 is a block diagram of a flare correcting circuit embodying the invention.
FIG. 11 is a schematic diagram illustrating two-dimensional flare.
FIG. 14 is a perspective view of a cathode ray tube.

FIG. 9 illustrates the complexities of flare which make it difficult to correct for. In the embodiment of FIG. 10, the automatic alignment sequence is utilised to store the flare profile with an accuracy dependent upon the number of samples used and the time interval between those samples. Because of the possible discontinuities such as the flare ring 94, it may be desirable to choose the samples and time intervals to optimise performance on individual systems. FIG. 10 illustrates a circuit which operates in a similar manner to that of FIG. 2 but allows for the fact that flare is a problem which affects pixels on both sides of the pixel being corrected whereas afterglow only affects those pixels which have already been visited by the flying spot. Thus, in the embodiment of FIG. 10 three circuit sections are arranged on either side of the main signal point. On the left hand side of adder 70 there are three delay elements 72, 74, 76 and three delay elements 78, 80, 82 to the right of the adder.

It is to be understood that the output of the accumulator 84 is connected to the inputs of all the latches.

The operation of the flare correction unit is slightly different due to the differences in the natures of flare and afterglow. Whereas afterglow is a temporal effect, flare is spatial in nature. Thus, instead of using a single illuminated pixel for alignment, the whole raster is illuminated and a test slide or a film with a pixel sized clear spot on an otherwise opaque film is used. From thereon the process is very similar to that described with reference to FIG. 2 for the circuits corresponding to delay elements 78, 80, 82, the correction co-efficients being copied into the symmetrically disposed latches corresponding to delay elements 72, 74, 76. Necessary modifications are made for the additional pipeline delays. This will be readily understood by those skilled in the art and need not be discussed further.

Figure 4:
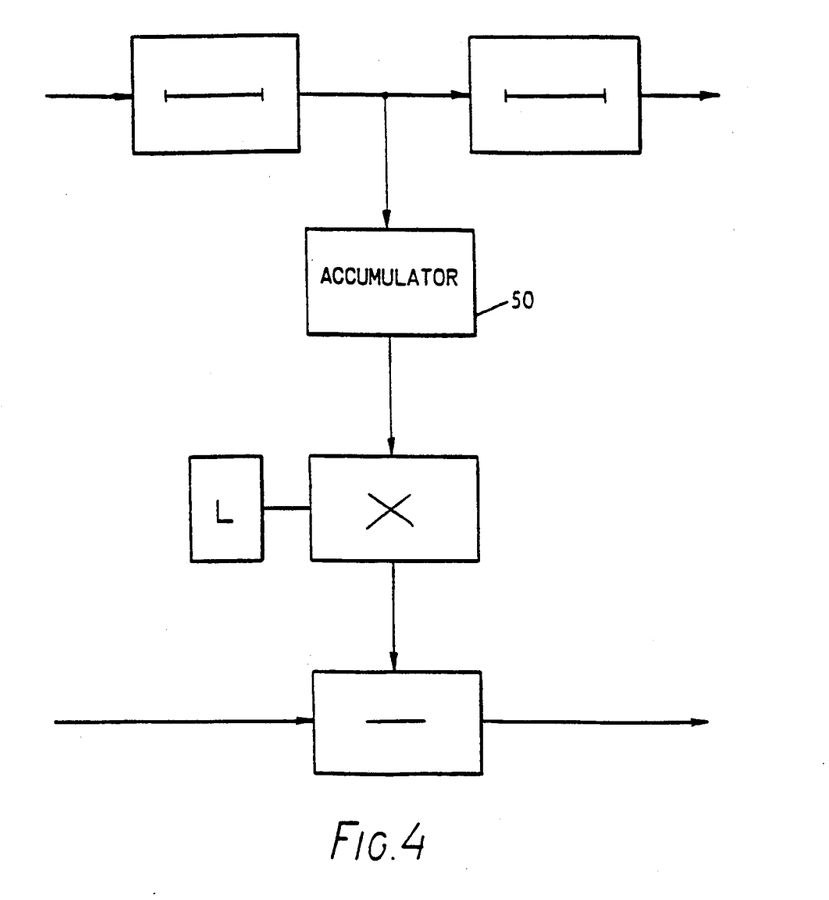
FIG. 4 is a schematic representation of a circuit section of a third embodiment of the invention.

It will be appreciated that the circuits of FIGS. 4 and 7 may also be adapated for use as flare correctors and, as the principles are the same as the modifications necessary to arrive at the circuit of FIG. 10, detailed description is not necessary. The FIG. 4 embodiment is realised by omitting accumulator 84 and adding an accumulator between each delay and multiplier, except in the case of the centre point where no accumulator is necessary and the leftmost multiplier where the input is undelayed but an accumulator is required.

The FIG. 7 embodiment is realized by replacing each latch with a comparator and a latch counter as described with respect of that figure.

Due to the symmetrical nature of flare the flare correctors described in their various embodiments can be modified by combining pairs of latches, thus reducing cost.

The circuits described enable a CRT display to be corrected for either afterglow or flare. It is possible to operate the circuit of FIG. 10 such that it corrects for both flare and afterglow.

Alignment by blanking the CRT beam results in a set of co-efficients which essentially describe the afterglow profile, whereas alignment by use of a film or blanking plate in the film path result in a set of correction co-efficients which describe a combination of afterglow and flare. Video data preceding the pulse is only affected by flare whereas data following the pulse is affected by both flare and afterglow.

The circuit of FIG. 10 can be aligned using film blanking to achieve a combined correction by measuring video levels at the appropriate times before and after the pulse, and then to calculate the correction co-efficients according to the formula derived for the afterglow correction circuit; $A-B(a)-C(b-a^2)-D(c-2ab+a^3)$.

An alternative method is to align succeeding samples after the pulse using CRT beam blanking according to the method described with reference to the operation of the circuit of FIG. 2 and to store the resultant values. This process is then repeated but using film blanking. The values obtained using film blanking are used as the correction co-efficients for succeeding samples. Correction co-efficients for the symmetrically disposed preceding samples are derived by subtracting from the stored 'beam blanking' co-efficients from the 'film blanking' co-efficients.

The flare correction circuitry described only corrects for video distortion occurring in the horizontal scanning direction.

Flare causes video distortions which are essentially symmetrical in two dimensions, full correction would therefore also require a vertical component of correction. The vertical correction may be accomplished by the same means as described previously but the delay elements would be of integral line times. By operating the vertical and horizontal correction in tandem a simple approximation to two-dimensional correction may be achieved.

Figure 12:
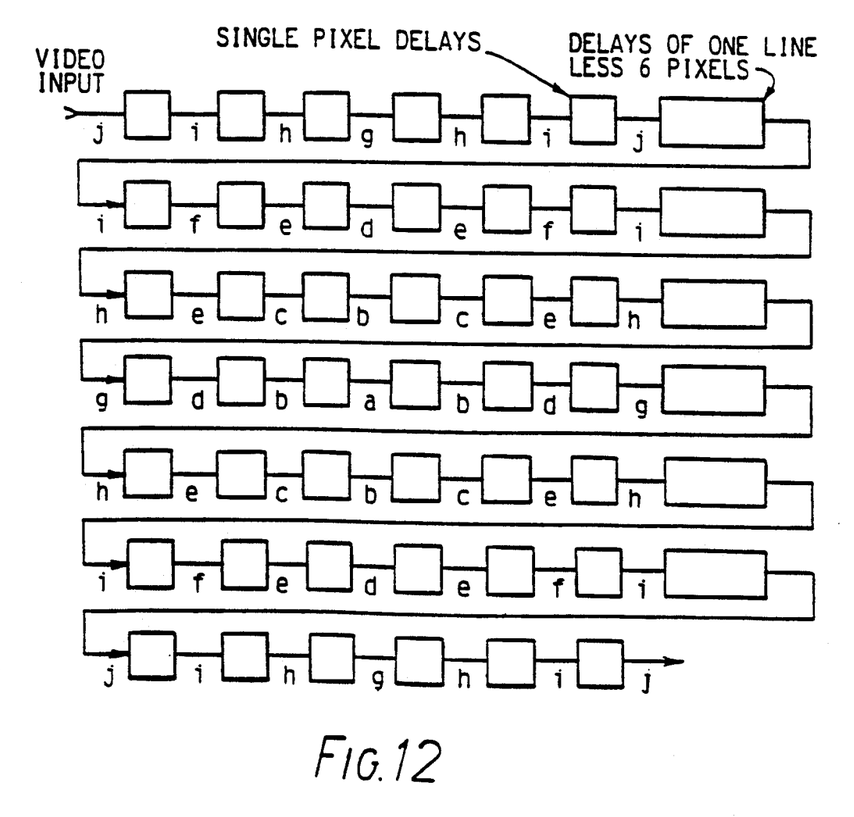
FIG. 12 shows the video path in a system correcting for two-dimensional flare.
Figure 13:
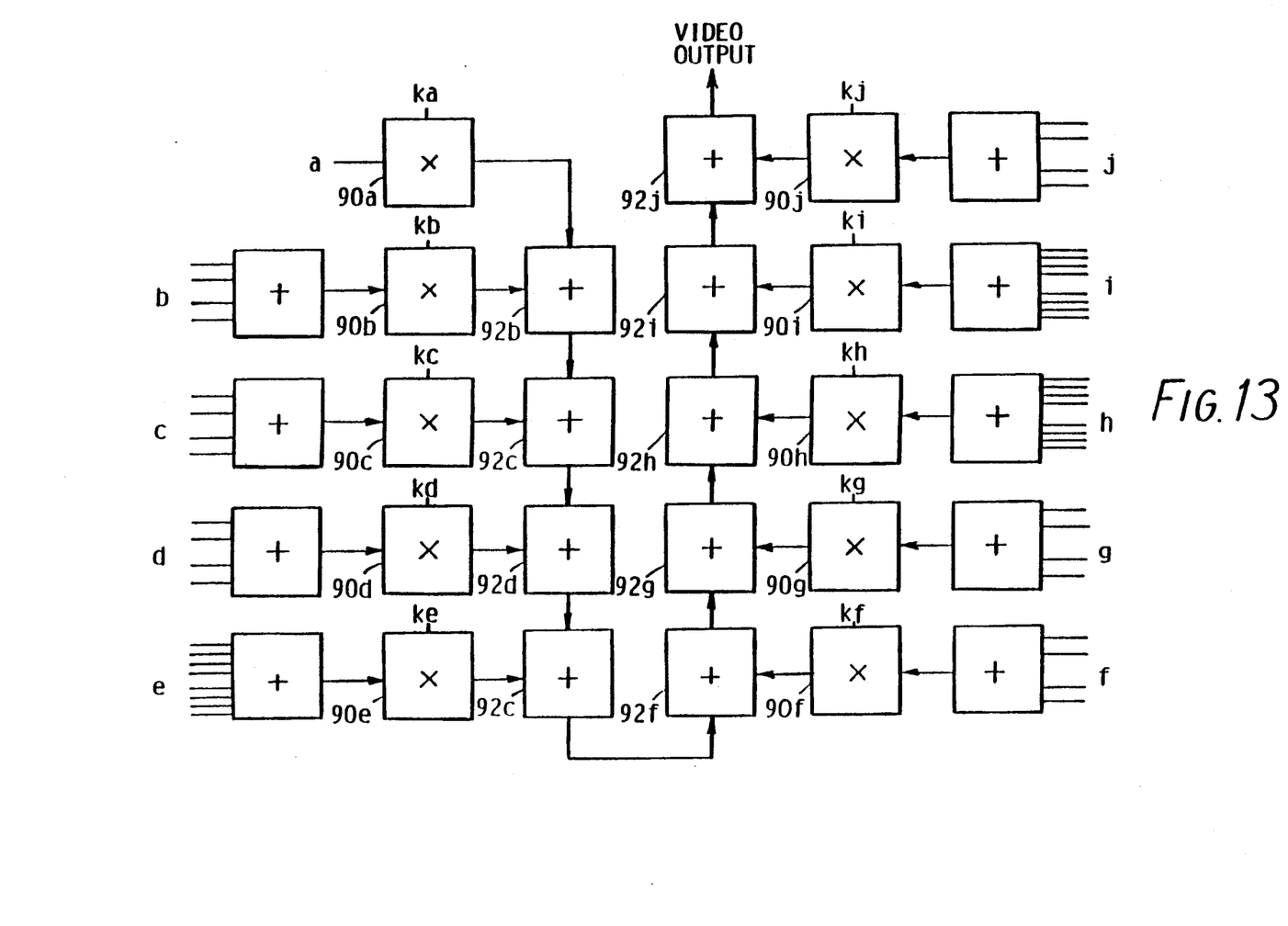

FIGS. 11 to 13 illustrate how a more accurate method of providing two-dimensional flare correction is achieved.

FIG. 11 shows how flare surrounds a single illuminated pixel (marked 'a'). Each square represents one pixel of the scanning map, only 7×7 pixels of the scan are shown. The other letters indicate the relative amount of flare at each location.

A full correction over this 7×7 area would need 49 circuit blocks. However the circuitry can be simplified to 9 flare correction blocks by taking advantage of the symmetry. FIG. 13 shows a schematic diagram which could be used to correct this 7×7 area. The circuit operates as a logical extension of FIG. 10. Alignment would preferably be performed by measuring the signal at a selection of delay points and from these calculating suitable correction co-efficients.

FIG. 12 shows the video path for a signal at pixel a which includes pixel delays at each of the points from which there is a flare contribution and line delays between adjacent lines.

Considering FIG. 13 in more detail it will be appreciated that each of the flare derivation circuits a to j have a number of inputs equal to the number of pixels in the 7-by-7 matrix which have that degree of flare. Thus, there is a single input from the 'a' flare corrector but eight inputs from the 'e' corrector. Each of the circuits is similar to that illustrated in FIG. 10. The output from each corrector is passed to a respective multiplier 90a to 90j and multiplied with a respective flare co-efficient 12ka to 12kj. The co-efficient is indicative of the relative strength of the flare at each of the points a to j. Thus 12a is the largest co-efficient. In addition the co-efficients are scaled to take account of the number of inputs to the respective multipliers. Thus, 12d includes a quarter scaling factor with respect to 12a. The output of multiplier 90a forms the input to an adder 92b which receives as its other input the output of multiplier 90b. The output from this adder forms the input to adder 92c and so on until the output of 92j represents the video signal corrected for two-dimensional flare.

The circuit of FIG. 10 may be considered as an F.I.R. filter with provision for adjusting the filter co-efficients according to signal measurements, and similarly FIG. 13 can be considered as a two dimensional F.I.R. filter.

Once the flare of a given system is known and remains constant, the alignment process could be dispensed with and the latches loaded with a set of predetermined co-efficients.

The flare and afterglow correcting circuits provide a profile of the CRT flare and afterglow respectively. These profiles can be used as measurement methods in CRT research for example in assessing the performance of CRT phosphors.

Although the description has been given with reference to a hardware system, it will be appreciated that the correction circuit could largely be implemented in software, in which case the various circuit diagrams of the figures may be regarded as being in the nature of flow charts.

I claim:

1. A method of correcting a digital output signal produced by a flying spot scanner which scans a cathode ray tube (CRT) phosphor screen with a flying spot to compensate for deviations from an ideal signal caused by inherent properties of the flying spot scanner, comprising the steps of determining for said digital output signal corresponding to a given location of the flying spot of the CRT, the proportion of said output signal contributed by each of a plurality of adjacent scanning locations or groups of locations, and subtracting each of the determined contributed proportions from said digital output signal to provide a corrected digital output signal.

2. A method according to claim 1, wherein the digital output signal is subjected to a series of delays each equal in length to the time taken for the spot to scan one location or group of locations, and the signal after each of the delays is scaled according to the aggregate length of delay, each of the scaled delayed signals being subtracted from the digital signal corresponding to the said given location of the flying spot.

3. A method according to claim 2, wherein the scaling of delayed signals is derived by illuminating the cathode ray tube face at a single scan location or group of locations and measuring the value of the digital signal from that location after each of the series of delays.

4. A method according to claim 3, wherein illumination of a single location or group of locations is achieved by blanking the flying spot at all other locations or groups of locations.

5. A method according to claim 3, wherein the scaling of delayed signals is derived from the average of a plurality of measurements of the value of the video signal from the said location after each of the series of delays.

6. A method according to claim 5, wherein the contribution for each scanning location or group of locations is derived by a respective one of a plurality of individual circuit sections each having means for holding a scaling factor, comprising the step of:
 a) clearing the holding means of each circuit section;
 b) at a time (t+a), measuring the contribution at a first scan location or group of locations over a plurality of scan frames, where t is the time at which the said given location is scanned and a is the time taken to scan a single location or group of locations or a multiple thereof;
 c) holding each contribution in an accumulator, taking the average and loading the average into the holding means of a circuit section of said plurality of circuit sections corresponding to the first scan location or group of locations;
 d) clearing the accumulator;
 e) repeating steps b) to d) at time (t+2a) for the second scan location;
 f) repeating step e) for each subsequent scan location or group of locations until (t+na) where n is equal to the total number of circuit sections; and
 g) applying the contents of each holding means to the signal to correct the signal.

7. A method according to claim 2, wherein the scaling of the delayed signals is derived by illuminating the cathode ray tube raster and inserting an opaque test slide or film having a clear non-opaque area the size of the location or group of locations.

8. A method according to claim 2, wherein each delay of said series of delays is equal in length.

9. A method according to claim 8, wherein each delay is equal to the time taken to scan one pixel of the cathode ray tube.

10. A method according to claim 2, wherein the length of each delay of said series of delays increases as the aggregate length of delay increases.

11. A method according to claim 10, wherein the length of each delay is equal to $(2^n - 1)$ times the time taken to scan one location, where n is the number in the series of the delay.

12. A method according to claim 1, wherein the total delay time of the series of the delays is in the range 20 to 50 microseconds.

13. A method according to claim 1, wherein the deviations from said ideal signal are caused by afterglow of said phosphor screen and the digital output signal from which said determined contributions are subtracted is a video signal, and the adjacent scanning locations for which a contribution is determined are locations or groups of locations previously visited by the flying spot.

14. A method according to claim 13 wherein the locations or groups of locations for which a contribution is determined are on the same scanning line.

15. A method according to claim 1, wherein the flying spot scanner includes a faceplate, the deviations from an ideal signal are caused by flare from said faceplate, and the adjacent scanning locations or groups of locations for which a contribution is determined are substantially symmetrically arranged around the flying spot at the said given location.

16. A method according to claim 15, wherein the flare correction is two-dimensional and the locations or groups of locations for which a contribution is determined are on a plurality of adjacent scanning lines.

17. A method of clamping the black level of an analogue video signal produced by a flying spot scanner which scans a cathode ray tube (CRT) phosphor screen with a flying spot to compensate for deviations from an ideal signal caused by inherent properties of the flying spot scanner, comprising converting the analog video signal into a digital signal, determining for the digital signal corresponding to a given location of the flying spot the proportion of said digital signal contributed by each of a plurality of adjacent scanning locations or groups of locations and subtracting each of the determined contributed proportions from the digital signal to provide a corrected digital signal, measuring the black level of the corrected digital signal and applying a clamp correction signal derived from the black level measurement to the analogue video signal prior to conversion.

18. A method according to claim 1, which includes storing the contributed proportions and automatically applying the stored contributed proportions to a subsequent digital output signal on subsequent operation of the scanner.

19. Apparatus for correcting a digit output signal produced by a flying spot scanner to compensate for deviations from an ideal signal caused by inherent properties of the flying spot scanner, comprising means for determining for said digital output signal corresponding to a given flying spot location, the proportion of said output signal contributed by from each of a plurality of adjacent scanning locations or groups of locations, and means for subtracting each of the determined contributions from the output signal to provide a corrected signal.

20. Apparatus according to claim 19, comprising means for subjecting the output signal to a series of delays each equal in length to the time taken for the spot to scan one location or group of locations, and means for scaling the signal after each delay according to the aggregate delay length, the subtracting means including means for subtracting the scaled delayed signals from the video signal corresponding to the said given spot location.

21. Apparatus according to claim 20, comprising means for deriving scaling factors for application by said scaling means, means for illuminating a single scan location or group of locations of the cathode ray tube, and means for measuring the video signal from the unblanked location after each of the series of delays.

22. Apparatus according to claim 22 wherein the deriving means comprises accumulator means for storing and taking the average of a plurality of measurements of the signal from the illuminated location after each of the series of delays.

23. Apparatus according to claim 22, wherein an individual accumulator is associated with each delay in the series.

24. Apparatus according to claim 22, wherein a single accumulator means successively stores and takes the average of the signal after each of the series of delays.

25. Apparatus according to claim 21, wherein said series of delays comprises a plurality of delays each of equal length.

26. Apparatus according to claim 25 wherein each delay is selected to be equal to the time taken to scan one pixel of the cathode ray tube.

27. Apparatus according to claim 20, wherein the series of delays comprises a plurality of delays each having a delay length and the length of each delay increases as the aggregate length of delay increases.

28. Apparatus according to claim 27, wherein the length of each delay is selected to be equal to $(2^n - 1)$ times the time taken to scan one location, where n is the position in the series of the delay.

29. Apparatus according to claim 20, wherein the apparatus corrects for afterglow of the CRT phosphor and the determining means determines contributions for a plurality of locations or groups of locations already visited by the flying spot.

30. Apparatus according to claim 30 comprising a plurality of individual circuit sections each having a holding means for holding a scaling factor for deriving the contribution for each scanning location or group of locations.

31. Apparatus according to claim 30 wherein the holding means for each circuit section of said plurality of circuit sections comprises a latch.

32. Apparatus according to claim 30 wherein the holding means for each circuit section of said plurality of circuit sections comprises a counter and a latch, the input to the counter and latch being the output of a comparator arranged to compare the blanking level with the output of the circuit section.

33. Apparatus according to claim 20, wherein the apparatus corrects for flare and the determining means determine contributions for a plurality of locations or groups of locations substantially symmetrically arranged around the said given location.

34. Apparatus according to claim 33, comprising a plurality of flare correcting circuits for correcting flare on a plurality of scanning lines adjacent to the given location, each circuit correcting one or more scanning locations having a substantially identical flare intensity.

35. Apparatus for clamping the black level of an analogue video signal, comprising means for converting the analogue signal into a digital signal, means for correcting the digital signal to compensate for flare and/or afterglow from a flying spot telecine, and means for determining the black level of the corrected signal, wherein a black level clamp correction signal is formed by black level measurement means and applied to the analogue video signal.

36. A method of clamping the black level of an analogue video signal, comprising converting the analogue signal into a digital signal, correcting the digital signal to compensate for flare and/or afterglow flame a flying spot telecine, determining the black level of the corrected signal, deriving a black level clamp correction signal from determined black level and applying the clamp correction signal to the analogue video signal.

37. A method of correcting a digital signal produced by a flying spot scanner to compensate for afterglow and flare, comprising the steps of:
   determining the afterglow contribution to the digital signal to acquire a first set of determined contributions and storing the first set, the afterglow contribution being determined by subjecting a digital signal to a series of delays each equal in length to the time taken for the flying spot to scan one location or group of locations and the signal after each o the delays being scaled according to aggregate length of delay, the scaling of delayed signals being derived by illuminating the cathode ray tube raster at a single scan location or group of locations and measuring the value of the digital signal from that location after each of the series of delays, illumination of a single location or group of locations being achieved by blanking the flying spot at all other locations or groups of locations,
   determining the flare contribution tot he digital signal to acquire a second set of determined contributions, the flare contribution being determined by subjecting the digital signal to a series of delays each equal in length to the time take for the flying spot to scan one location or group of locations and the signal after each of the delays being scaled according to the aggregate length of the of the delay, the scaling of the delayed signals being derived by illuminating the cathode ray tube raster and inserting an opaque test slide or film having a non-opaque spot the size of the location or group of locations,
   subtracting the second set of contributions from the locations or groups of locations succeeding the given location,
   subtracting the first set of contributions from the second set of contributions to form a third set, and
   subtracting the third set from the locations or groups locations preceding the given location.

38. Apparatus for clamping the black level of an analogue video signal reduced by a flying spot scanning which scans a cathode ray tube (CRT) phosphor screen with a flying spot to compensate for deviations from an ideal signal caused by inherent properties of the flying spot scanner, comprising means for converting the analogue signal into a digital signal, means for determining for the digital signal corresponding to a given location of the flying spot the proportion of said digital signal contributed by each of a plurality of adjacent scanning locations or groups of locations; means for subtracting each of the determined contributed proportions from the digital signal to provide a corrected digital signal, means for determining the black level of the corrected digital signal, and means for forming a black level correction signal from the output of the black level determining means and for applying the black level clamp correction signal to yhe analogue video signal.

* * * * *